(12) United States Patent
Miller et al.

(10) Patent No.: US 10,035,513 B2
(45) Date of Patent: Jul. 31, 2018

(54) SEAT BELT HEIGHT SYSTEM AND METHOD

(71) Applicant: Ford Global Technologies, LLC, Dearborn, MI (US)

(72) Inventors: Kenneth James Miller, Canton, MI (US); William Paul Perkins, Dearborn, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 426 days.

(21) Appl. No.: 14/695,301

(22) Filed: Apr. 24, 2015

(65) Prior Publication Data

US 2016/0311399 A1  Oct. 27, 2016

(51) Int. Cl.
| | |
|---|---|
| *B60R 21/16* | (2006.01) |
| *B60R 22/48* | (2006.01) |
| *B60W 40/08* | (2012.01) |
| *B62D 1/18* | (2006.01) |
| *B62D 1/181* | (2006.01) |
| *B60R 16/037* | (2006.01) |
| *B60R 22/20* | (2006.01) |
| *B60R 21/015* | (2006.01) |

(52) U.S. Cl.
CPC ........... *B60W 40/08* (2013.01); *B60R 16/037* (2013.01); *B60R 21/01512* (2014.10); *B60R 21/01554* (2014.10); *B60R 22/201* (2013.01); *B62D 1/181* (2013.01); *B60R 2021/161* (2013.01)

(58) Field of Classification Search
CPC .................. B60R 16/037; B60R 21/16; B60R 2021/01256; B60R 2021/161; B60W 40/08
See application file for complete search history.

(56) References Cited

U.S. PATENT DOCUMENTS

| | | | | |
|---|---|---|---|---|
| 5,993,015 A | * | 11/1999 | Fredricks | B60R 1/02 359/839 |
| 6,039,139 A | | 3/2000 | Breed et al. | |
| 6,250,681 B1 | * | 6/2001 | Takahashi | B60R 22/28 280/801.2 |
| 6,501,536 B1 | * | 12/2002 | Fredricks | B60R 1/02 180/271 |
| 7,469,928 B2 | | 12/2008 | Clute | |
| 8,686,922 B2 | * | 4/2014 | Breed | B60N 2/002 340/901 |
| 2002/0128882 A1 | * | 9/2002 | Nakagawa | G06Q 30/02 705/4 |

(Continued)

FOREIGN PATENT DOCUMENTS

| | | |
|---|---|---|
| CN | 103010150 A | 4/2013 |
| IT | WO2009025594 | 2/2009 |

(Continued)

*Primary Examiner* — Thomas G Black
*Assistant Examiner* — Ce Li Li
(74) *Attorney, Agent, or Firm* — Frank A. MacKenzie; Bejin Bieneman PLC (57) ABSTRACT

A system for a vehicle includes a seat belt height adjuster and a sensor configured to determine eye location of a driver of the vehicle. A control module is in communication with the sensor and the seat belt height adjuster. The control module is programmed to adjust a position of the seat belt height adjuster based at least on the eye location.

19 Claims, 6 Drawing Sheets

(56) References Cited

U.S. PATENT DOCUMENTS

| | | | | |
|---|---|---|---|---|
| 2002/0175810 A1* | 11/2002 | Munch | | B60R 1/025 340/436 |
| 2003/0125855 A1* | 7/2003 | Breed | | G06K 9/00832 701/36 |
| 2003/0169906 A1* | 9/2003 | Gokturk | | G06K 9/00201 382/115 |
| 2004/0036270 A1 | 2/2004 | Roychoudhury et al. | | |
| 2005/0156457 A1* | 7/2005 | Breed | | B60N 2/002 297/467 |
| 2007/0280505 A1* | 12/2007 | Breed | | B60W 40/08 382/104 |
| 2008/0042409 A1* | 2/2008 | Breed | | B60R 21/0134 280/735 |
| 2008/0234899 A1* | 9/2008 | Breed | | B60N 2/002 701/47 |
| 2009/0261566 A1* | 10/2009 | Pelliccia | | B60R 22/20 280/801.2 |
| 2010/0241309 A1 | 9/2010 | Demirdjian et al. | | |
| 2011/0285186 A1* | 11/2011 | Demmelmeier | | B60N 2/0248 297/217.1 |
| 2012/0053794 A1* | 3/2012 | Alcazar | | B60N 2/0244 701/48 |
| 2012/0078472 A1* | 3/2012 | Neal | | B60R 25/00 701/45 |
| 2014/0132056 A1* | 5/2014 | Yilma | | B60R 22/20 297/481 |
| 2014/0175780 A1* | 6/2014 | Birk | | B60R 22/03 280/801.2 |
| 2015/0210218 A1* | 7/2015 | Kuenzner | | G06K 9/00597 701/49 |
| 2015/0379362 A1* | 12/2015 | Calmes | | G06K 9/2036 348/136 |

FOREIGN PATENT DOCUMENTS

| | | |
|---|---|---|
| WO | WO9747499 | 12/1997 |
| WO | WO2014128273 | 8/2014 |

* cited by examiner

SEAT BELT HEIGHT SYSTEM AND METHOD

BACKGROUND

Vehicles include retractable seat belts to retain occupants in seats. The seat belt may include an end fixed to a component of the vehicle, such as a pillar of the vehicle. The other end of the seat belt may be engaged with a retractor that is fixed relative to the seat. A D-ring is mounted to the pillar of the vehicle and supports the seat belt at shoulder level of the occupant.

The position of the D-ring relative to the occupant may affect the operation of the seat belt and, as such, it is desirable to properly position the D-ring relative to the operator. The D-ring may be vertically adjustable along the pillar to accommodate varying shoulder heights of different occupants. For example, the D-ring may be manually adjustable. A mechanical feature may be releasably fixed between the D-ring and the pillar and may be released by the occupant to adjust the D-ring along the pillar.

Occupants may not adjust the position of the D-ring along the pillar. This may be for a variety of reasons, such as, because the D-ring is out of sight of the occupant, because the occupant is unaware that the position of the D-ring affects operation of the seat belt, because the occupant is busy and chooses not to take the time to adjust the D-ring, and/or because the occupant is unaware that a previous occupant changed the position of the D-ring.

Accordingly, there remains an opportunity to develop a system that encourages proper positioning of the D-ring relative to the occupant.

DETAILED DESCRIPTION

With reference to the Figures, wherein like numerals indicate like parts throughout the several views, a system 10 for a vehicle 12 includes a seat belt height adjuster 14 and a sensor for detecting at least one feature of an occupant of a seat 48 of the vehicle 12, i.e., a driver 80 in a driver seat. The system 10 includes a control module, e.g., a restraints control module 16, a body control module 18, or a height adjustment module (not shown), programmed to adjust a position of the seat belt height adjuster 14 based on the measured feature of the driver 80. A first embodiment of the system 10 is shown, for example, in FIGS. 2-4. As set forth further below, a second embodiment of the system 10 is shown, for example, in FIGS. 5-6. Common numerals are used herein to refer to common elements in the first and second embodiments.

Figure 1:
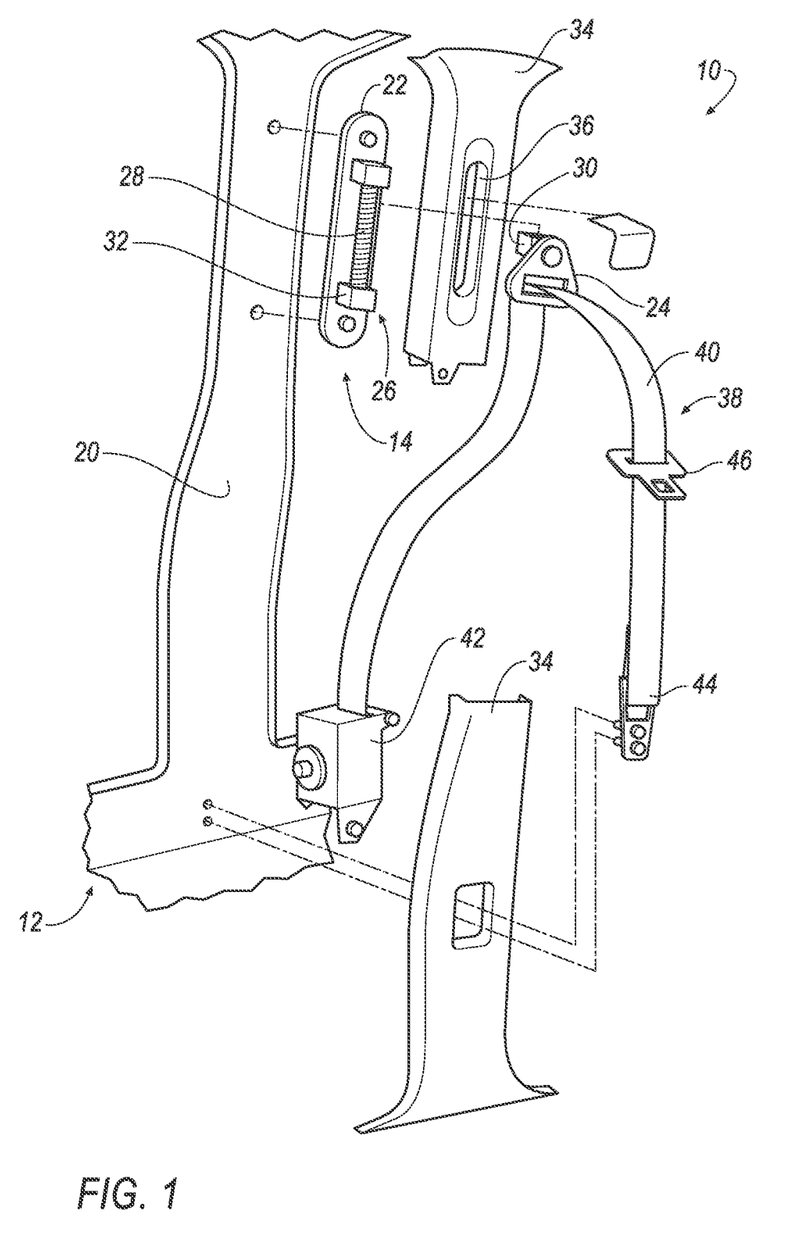
FIG. 1 is an exploded view of a portion of a vehicle including a pillar and a seat belt assembly coupled to the pillar.
Figure 2:
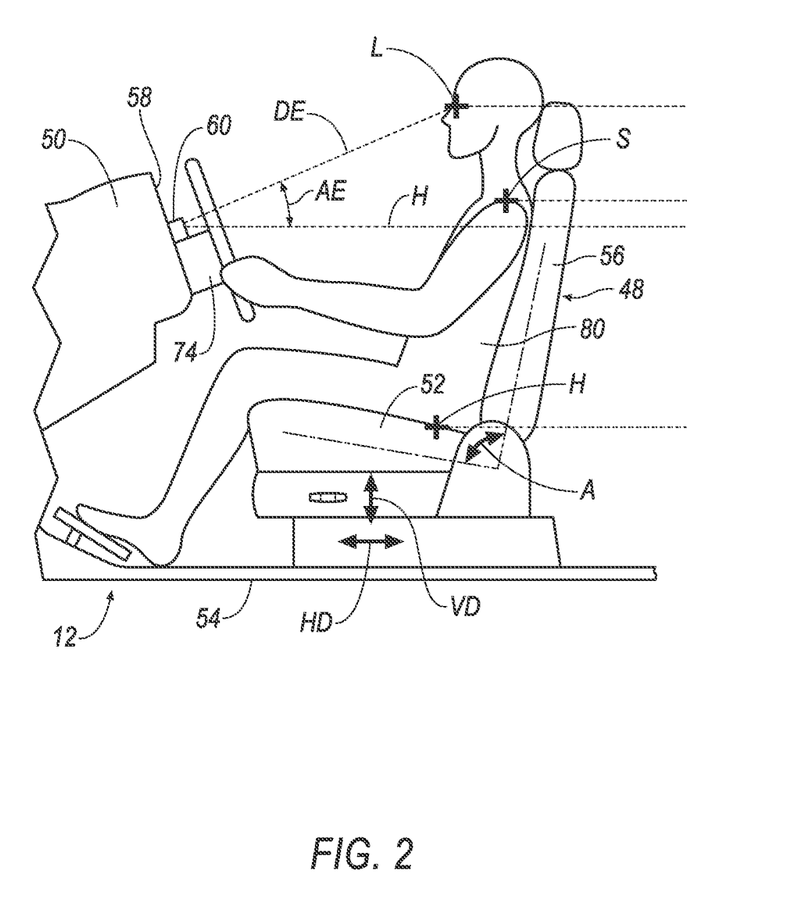
FIG. 2 is a side view of a portion of the vehicle including a seat, an instrument panel, and a steering column, with a driver seated in the seat.
Figure 3:
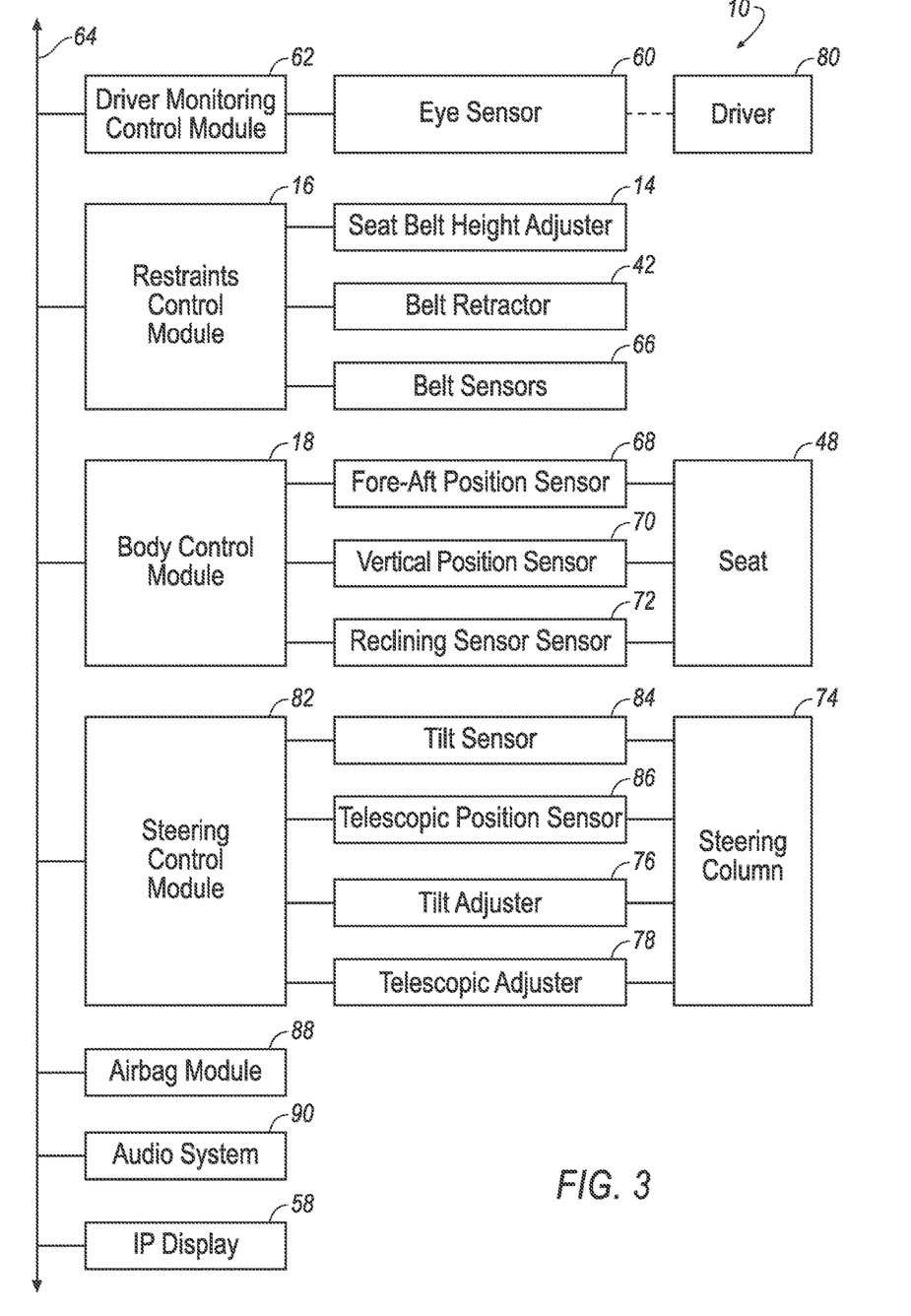
FIG. 3 is a schematic of a first embodiment of a seat belt height adjuster system.
Figure 4:
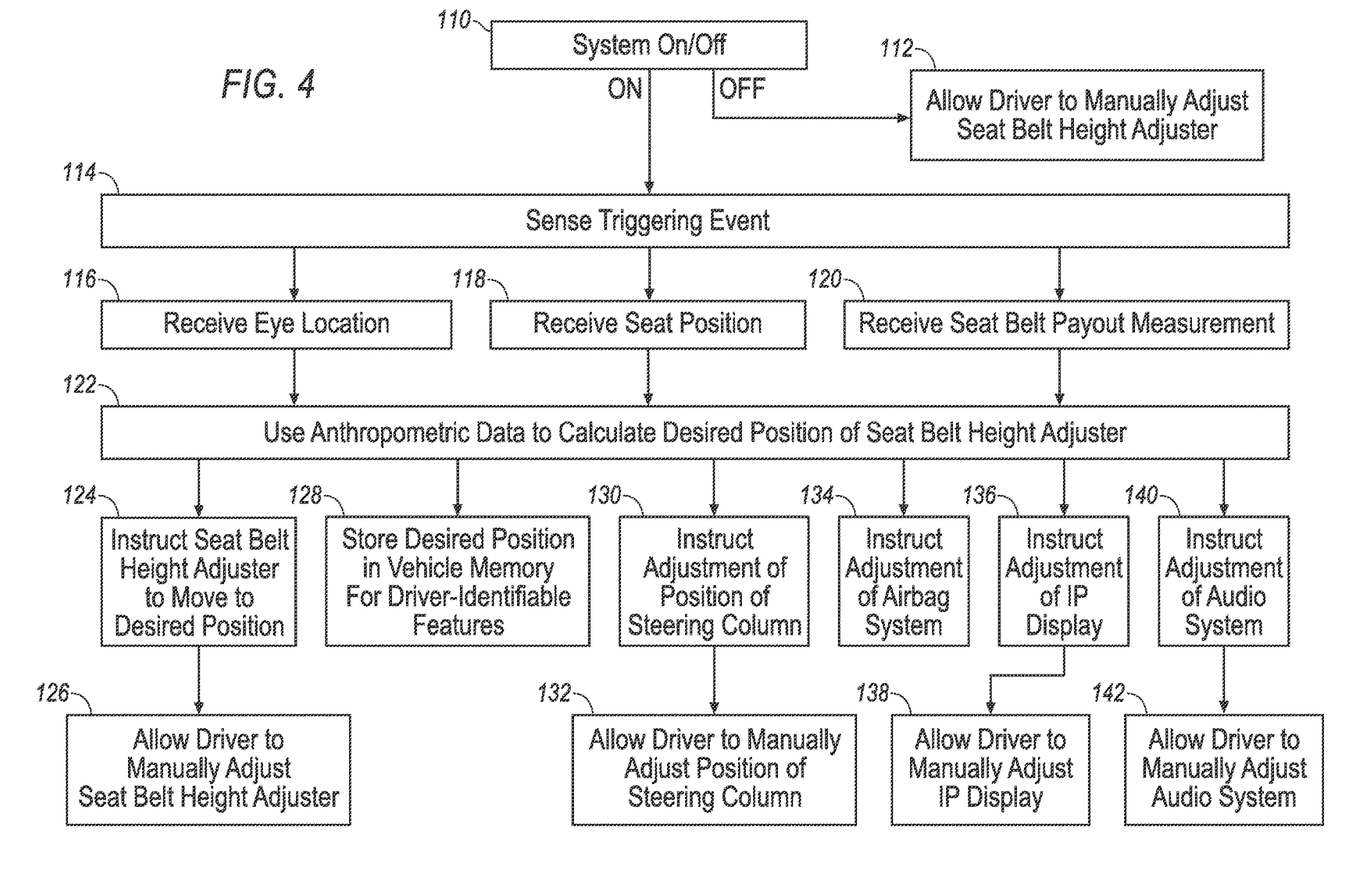
FIG. 4 is a flow chart of a method of the first embodiment.
Figure 5:
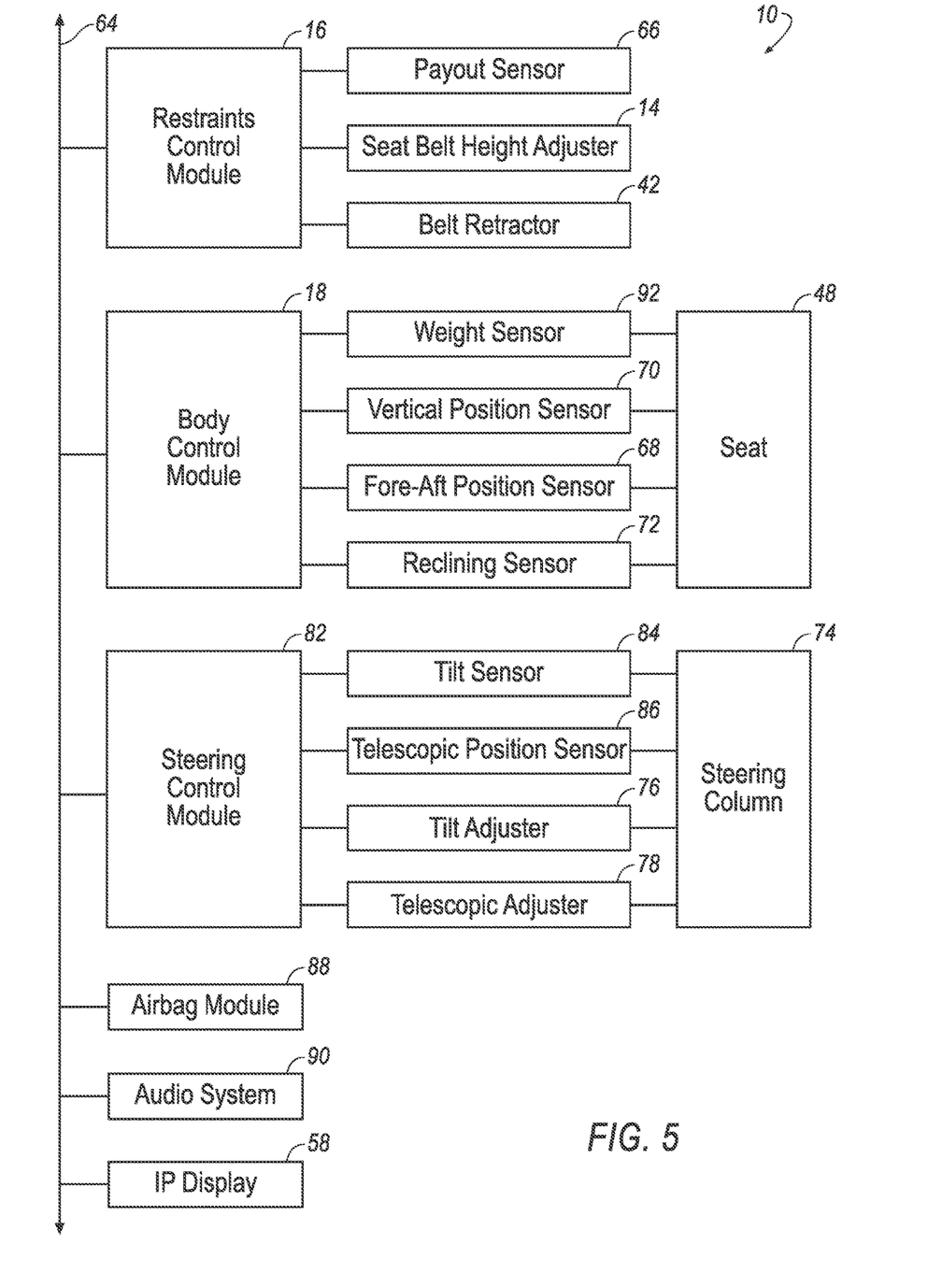
FIG. 5 is a schematic of a second embodiment of the seat belt height adjuster system.
Figure 6:
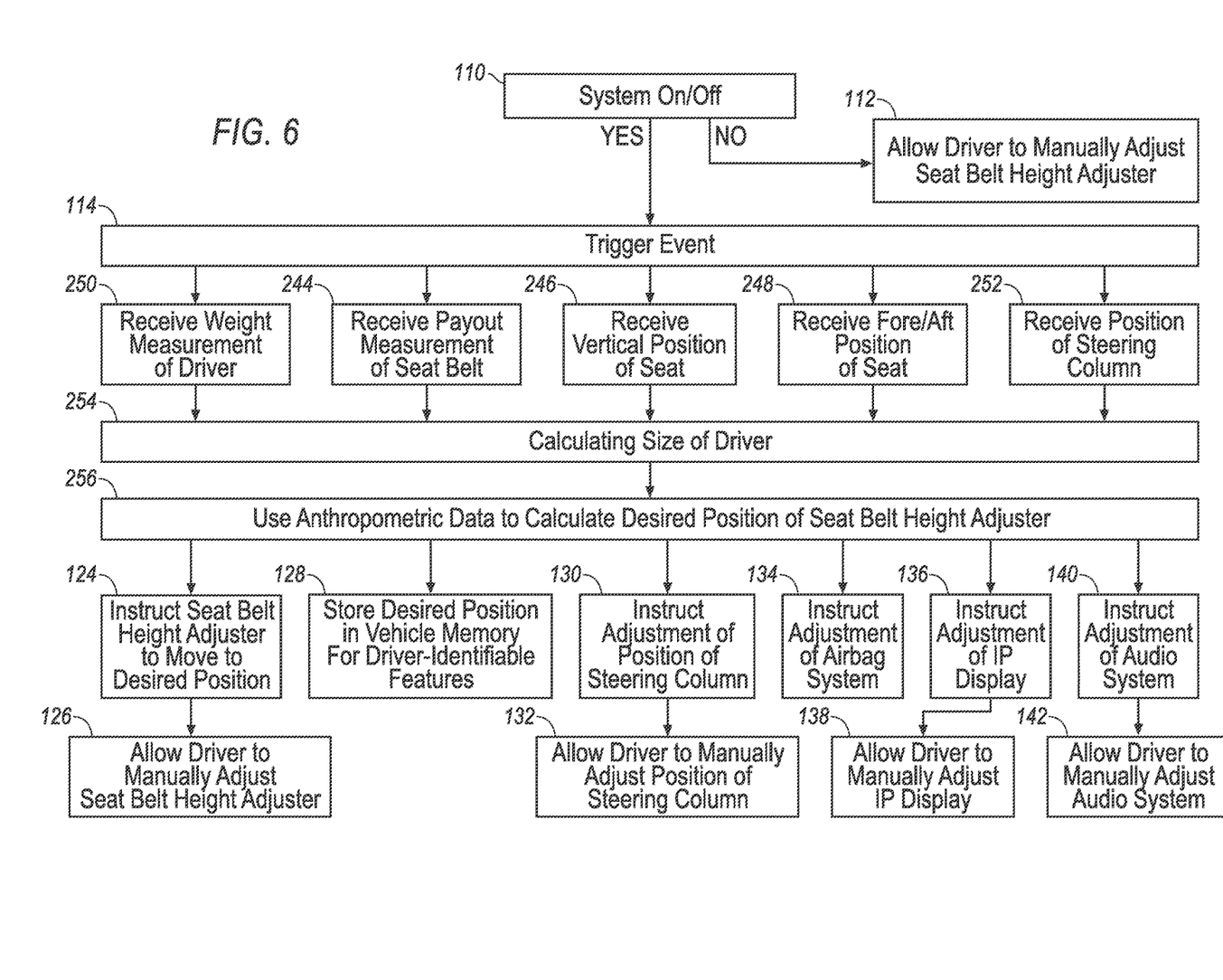
FIG. 6 is a flow chart of a method of the second embodiment.

FIG. 1 includes features common to both the first embodiment of FIGS. 2-4 and the second embodiment of FIGS. 5-6. FIG. 1 shows a pillar 20 of the vehicle 12, e.g., the B-pillar 20. The seat belt height adjuster 14 may be fixed to the pillar 20, as shown in FIG. 1. The seat belt height adjuster 14 may be mounted to the pillar 20 in any suitable manner, e.g., fasteners as shown in FIG. 1, and/or welding, etc. Specifically, the seat belt height adjuster 14 may include a base 22 mounted to the pillar 20.

With continued reference to FIG. 1, the seat belt height adjuster 14 may include a seat belt ring 24, also referred to as a D-ring, adjustably coupled to the base 22. For example, the seat belt height adjuster 14 may include a linear actuator 26 between the base 22 and the seat belt ring 24. The linear actuator 26 may be of any suitable type, such as, mechanical, electro-mechanical, hydraulic, pneumatic, piezoelectric, etc.

For example, as shown in FIG. 1, the linear actuator 26 includes a lead screw 28 and a nut 30 threadedly engaged with the lead screw 28. The nut 30 is fixed to the seat belt ring 24. A motor 32 is supported on the base and supports the lead screw 28. The motor 32 rotates the screw to move the nut 30 and the seat belt ring 24 along the lead screw 28. The motor 32 is in communication with the restraints control module 16 and/or the body control module 18 and the restraints control module 16 and/or the body control module 18 controls the rotation of the motor 32, as set forth further below. The linear actuator 26 may alternatively include a rack and pinion gear, a worm gear, etc. The motor 32 may be any suitable type of motor.

With continued reference to FIG. 1, the vehicle 12 includes a trim panel 34 fixed to the pillar 20, e.g., with mechanical fasteners (not shown). The trim panel 34 defines a slot 36 extending generally vertically. The seat belt ring 24 and/or the nut 30 extends through the slot 36 and rides along the slot 36 as the lead screw 28 rotates. In other words, the slot 36 limits movement of the seat belt ring 24 to linear movement along the slot 36 such that rotational movement of the lead screw 28 is translated into linear movement of the seat belt ring 24 along the slot 36. The trim panel 34 may be plastic, vinyl, and/or any suitable material. The trim panel 34 may define a class-A surface, i.e., a surface specifically manufactured to have a high quality, finished aesthetic appearance free of blemishes. The class-A surface may have any suitable surface texture. The trim panel 34 may include a reinforcing feature (not shown) along the slot 36 to interact with the seat belt ring 24 and/or the nut 30. A cover may be disposed on at least a portion of the seat belt ring 24.

With continued reference to FIG. 1, the vehicle 12 includes a seat belt assembly 38. The seat belt assembly 38 includes a seat belt 40 and a retractor 42 retractably receiving the seat belt 40. The seat belt 40 may be paid out of the retractor 42, i.e., extended from the retractor 42, by pulling the seat belt 40 from the retractor 42. In other words, payout of the seat belt 40 is the length of seat belt 40 pulled from the retractor 42. The retractor 42 is spring-loaded, such that the seat belt 40 is automatically retracted into the retractor 42 when released.

The seat belt 40 extends from a first end engaged with the retractor 42 and second end 44 fixed to the vehicle 12, e.g., fixed to the pillar 20. The second end 44 may be fixed to the pillar 20 in any suitable fashion. The seat belt 40 is supported on the seat belt ring 24 between the first end and the second 44 end to position the seat belt 40 across the shoulder of the driver 80. The seat belt assembly 38 included a clip 46 that is selectively engageable with a buckle fixed to the vehicle 12, e.g., to a seat 48 of the vehicle 12, to fasten the driver 80 to the seat 48.

The seat 48 of the vehicle 12 is disposed adjacent the pillar 20 of the vehicle 12 and in front of an instrument panel 50 (shown in FIG. 2). As shown in FIG. 2, the seat 48 includes a seat bottom 52 mounted to a floor 54 of the vehicle 12 and a seat back 56 mounted to and extending upwardly from the seat bottom 52. The seat bottom 52 is moveable in a fore-aft direction HD relative to the floor 54 and the instrument panel 50. The seat bottom 52 may be movably mounted to the floor 54 in any suitable fashion, e.g., a base mounted to tracks, rails, etc.

The seat back 56 is pivotably mounted to the seat bottom 52. The seat back 56 may be selectively pivoted about the seat bottom 52, e.g., reclined relative to the seat bottom 52, to a selected angle A.

The instrument panel 50 may include an instrument display panel 58, which displays information such as vehicle 12 operation information, entertainment information, etc. The instrument display panel 58 may be located on any location of the instrument panel 50. An instrument display panel 58 may also be located at positions in the vehicle 12 other than the instrument panel 50.

With reference to FIGS. 2-4, in the first embodiment of the system 10, an eye sensor 60 is configured to determine eye location L of the driver 80 of the vehicle 12. As set forth further below, the system 10 adjusts the position of the seat belt height adjuster 14 based on the eye location L.

With reference to FIG. 3, the eye sensor 60 may be connected to a driver monitoring control module 62, which may be connected to a communication bus 64, such as a controller area network (CAN) bus, of the vehicle 12. As shown in FIG. 3, a plurality of modules are connected to the communication bus 64. Each module connected to the communication bus 64 may communicate with each other through the communication bus 64.

As set forth above, the eye sensor 60 is configured to determine the eye location L of the driver 80. As shown in FIG. 2, the eye sensor 60 may be mounted to the instrument panel 50 in a position to detect the eye location L. The eye sensor 60 may include a charge-coupled device (CCD) camera including infrared light emitting diode (LED) detectors configured to detect eye location L. As shown in FIG. 2, the eye sensor 60 may determine the distance DE between the eye sensor 60 and the eye location L and may determine the angle AE at the eye sensor 60 between horizontal H and the eye location L. The eye sensor 60 may, alternatively, be of any suitable configuration.

One of the modules connected to the communications bus 64 is programmed to adjust a position of the seat belt height adjuster 14 based at least on eye location L. For example, with reference to FIG. 3, the restraints control module 16 is connected to the communication bus 64 and is in communication with the eye sensor 60 through the communication bus 64 to receive information corresponding to the eye location L measured by the eye sensor 60. The seat belt height adjuster 14 is connected to the restraints control module 16. In this configuration, the restraints control module 16 may be programmed to adjust a position of the seat belt height adjuster 14 based at least on the eye location L. Specifically, with reference to the configuration shown in FIG. 1, the restraints control module 16 may programmed to control the motor 32 to rotate the lead screw 28 to adjust the position of the seat belt height adjuster 14. Alternatively, another module, such as the driver monitoring control module 62 or the body control module 18, may be programmed to adjust a position of the seat belt height adjuster 14 based at least one eye location L, e.g., to control the motor 32 to rotate the lead screw 28 to adjust the position of the seat belt height adjuster 14.

As another example, not shown in the Figures, the seat belt height adjuster 14 may be connected to the body control module 18, in which case the body control module 18 may be programmed to adjust a position of the seat belt height adjuster 14 based at least on the eye location L. As another example, the seat belt height adjuster 14 may be connected to a height adjustment module (not shown), which may be connected to the communication bus 64. The height adjustment module may be dedicated to controlling the seat belt height adjuster 14. In such an example, the height adjustment module may be programmed to adjust a position of the seat belt height adjuster 14 based at least on the eye location L.

As set forth above, the restraints control module 16 is programmed to adjust a position of the seat belt height adjuster 14 based at least on the eye location L. In addition to the eye location L, the restraints control module 16 (or alternatively the body control module 18 or the height adjustment module) may be programmed to adjust the position of the seat belt height adjuster 14 based on the seat position (such as the fore-aft position along fore-aft direction HD, the vertical position in the vertical direction VD, and/or the reclining position about angle A) and/or seat belt payout.

Specifically, with reference to FIG. 3, the system 10 may include belt sensors in communication with the restraints control module 16. The belt sensors may include at least a payout sensor 68. The payout sensor 68 senses the payout of the seat belt relative to the retractor 42. The restraints control module 16 (or alternatively the body control module 18 or the height adjustment module) may be programmed to adjust the position of the seat belt height adjuster 14 based at least on information from the payout sensor 68.

With continued reference to FIG. 3, the system 10 may include at least one seat sensor. The seat sensor is configured to determine a position of the seat of the vehicle 12 relative to the floor. Specifically, seat sensors may include a fore-aft position sensor 68 configured to measure the for-aft position, i.e., horizontal position, of the seat bottom 52 relative to the floor 54, a vertical position sensor 70 configured to measure the vertical position of the seat bottom 52 relative to the floor 54, and/or a reclining sensor 72 configured to measure the reclining angle A between the seat back 56 and the seat bottom 52.

The seat sensors, e.g., the fore-aft position sensor 68, the vertical position sensor 70, and the reclining sensor 72, may be connected to a body control module 18. The body control module 18 may be connected to the communication bus 64 and may be in communication with the restraints control module 16 through the communication bus 64. The restraints control module 16 (or alternatively the body control module 18 or the height adjustment module) may be programmed to adjust the position of the seat belt height adjuster 14 based at least on information from the seat sensors.

The restraints control module 16 (or alternatively the body control module 18 or the height adjustment module) may be programmed with anthropometric data and may be programmed to compare at least the eye location L with the anthropometric data to calculate the desired position of the seat belt height adjuster 14. Anthropometric data includes relative measurements of human bodies and can be used to correlate measurements of a human body with other dimensions of the human body. Anthropometric data may be stored in a table programmed in the restraints control module 16.

The restraints control module 16 (or alternatively the body control module 18 or the height adjustment module) may be programmed to determine a regression model of the anthropometric data and the eye location L to calculate the desired position of the seat belt height adjuster 14 based on the regression model. The position of the hip H and/or the position of the shoulder S of the driver 80 may be calculated based on the anthropometric data and may be used to calculate the desired position of the seat belt height adjuster 14.

With reference to FIGS. 2 and 3, the vehicle 12 may include a steering column 74. The steering column 74 may be selectively adjustable relative to the instrument panel 50 between various tilt positions and various telescopic positions, i.e., axial positions. With reference to FIG. 3, the steering column 74 may include a steering column position adjuster, e.g., a tilt adjuster 76 configured to adjust the tilt of the steering column 74 relative to the instrument panel 50, and/or a telescopic adjuster 78 configured to adjust the telescopic position of the steering column 74 relative to the instrument panel 50.

A steering control module 82 may be in communication with the eye sensor 60 and the steering column 74 position adjuster, e.g., the tilt adjuster 76 and/or the telescopic adjuster 78. Specifically, as shown in FIG. 3, the eye sensor 60 may be in communication with the driver monitoring control module 62, which is in communication with the steering control module 82 through the communication bus 64.

The steering control module 82 may be programmed to adjust the position of the steering column 74, e.g., the tilt position and/or the telescopic position, based at least on the eye location L and/or the seat position (such as the fore-aft position, the vertical position, and/or the reclining position). Information about the eye location L and/or the seat position may be communicated to the steering control module 82 and the steering control module 82 may instruct the tilt adjuster 76 and/or the telescopic adjuster 78 to adjust the position of the steering column 74 based on the eye location L and/or the seat position. The instructions for the tilt adjuster 76 and/or the telescopic adjuster 78 may be generated in the restraints module, the driver monitoring control module 62, the body control module 18, and/or the steering control module 82. The instructions may be based on anthropometric data stored, for example, in the restraints control module 16, the driver monitoring control module 62, the body control module 18, and/or the steering control module 82.

The tilt adjuster 76 and/or the telescopic adjuster 78 may each include a motor (not shown) connected to the steering control module 82. The steering control module 82 may control the motors to adjust the tilt adjuster 76 and the telescopic adjuster 78.

With continued reference to FIG. 3, the system 10 may include a tilt sensor 84 configured to measure the tilt of the steering column 74 relative to the instrument panel 50, and/or a telescopic position sensor 86 configured to measure the telescopic position, i.e., the axial position, of the steering column 74 relative to the instrument panel 50. The tilt sensor 84 and the telescopic position sensor 86 may be in communication with the steering control module 82 and may provide feedback to the steering control module 82.

With continued reference to FIG. 3, the system 10 may include an airbag control module 88 in communication with the eye sensor 60. The airbag control module 88 may be programmed to adjust operation of the airbag control module 88 based at least on the eye location L and/or the seat position (such as the fore-aft position, the vertical position, and/or the reclining position). Information about the eye location L and/or the seat position may be communicated from the eye sensor 60 to the airbag control module 88 through the communication bus 64 and the airbag control module 88 may operate based on the information. For example, the operation of the airbag control module 88 based on the information may include inflation speed, inflation pressure, etc., of an airbag (not shown). The information may be based on anthropometric data stored, for example, in the restraints control module 16, the driver monitoring control module 62, the body control module 18, and/or the airbag control module 88.

With continued reference to FIG. 3, the system 10 may include an audio system 90 in communication with the eye sensor 60. The audio system 90 may be programmed to adjust operation of the audio system 90 based at least on the eye location L and/or the seat position (such as the fore-aft position, the vertical position, and/or the reclining position). Information about the eye location L and/or the seat position may be communicated from the eye sensor 60 to the audio system 90 through the communication bus 64 and the steering control module 82 may operate base on the information. For example, the operation of the audio system 90 based on the information include sound levels, sound directions, surround sound settings, etc. The information may be based on anthropometric data stored, for example, in the restraints control module 16, the driver monitoring control module 62, the body control module 18, and/or the audio system 90.

With continued reference to FIG. 3, the system 10 may include an instrument display panel 58 in communication with the eye sensor 60. The instrument display panel 58 may be programmed to adjust operation of the instrument display panel 58 based at least on the eye location L and/or the seat position (such as the fore-aft position, the vertical position, and/or the reclining position). Information about the eye location L and/or the seat position may be communicated to the instrument display panel 58 and the instrument display panel 58 may operate based on the information. For example, operation of the instrument display panel 58 based on the information include display brightness, display angle, display content, etc. The information may be based on anthropometric data stored, for example, in the restraints control module 16, the driver monitoring control module 62, the body control module 18, and/or the instrument display panel 58.

With reference to FIG. 4, an exemplary method of operating the first embodiment of the system 10 is generally shown. As shown in block 110, the system 10 is turned on or off. For example, the vehicle 12 may include a button, e.g., on the pillar 20, the seat belt height adjuster 14, or elsewhere in the vehicle 12, that may turn the system 10 on or off.

When turned off, the driver 80 may manually adjust the seat belt height adjuster 14, as shown in block 112. For example, a button, switch, etc., operable by the fingers of the driver 80, may be disposed on the seat belt height adjuster 14 and may be in communication with the motor 32 to adjust the seat belt height adjuster 14. Alternatively, or in addition, a control may be disposed on a steering wheel, center console, instrument panel 50, etc., and may be in communication with the motor 32 to adjust the seat belt height adjuster 14. In addition or the alternative to manually controlling the motor 32 to adjust the seat belt height adjuster 14, the seat belt height adjuster 14 may include a mechanical feature for adjusting the seat belt height adjuster 14.

As shown in block 114, if the system 10 is on, the method includes sensing a triggering event before proceeding, e.g., before receiving the measurement of the eye location L. The triggering event may be an event that occurs when the driver 80 is properly seated in the seat with the seat belt 40 fastened. For example, the triggering event may be ignition/initial powering of the vehicle 12 communicated through the communication bus 64. As another example, the triggering event may be the initial unlocking of doors of the vehicle 12, e.g., with a key fob, door keypad, etc. The triggering event may be sensed by any suitable component of the system 10, e.g., the driver monitoring control module 62, the restraints control module 16, the body control module 18, and/or the height adjustment module.

As shown in block 116, the method includes receiving a measurement of an eye location L of a driver 80 of a vehicle 12. Specifically, when the triggering event is sensed, the eye sensor 60 detects the eye location L of the driver 80. The measurement of the eye location L may be received, for example, by the driver monitoring control module 62, the restraints control module 16, the body control module 18, and/or the height adjustment module.

As shown in block 118, the method includes receiving a measurement of a seat position and calculating the desired position based on the measurement of the seat position. Specifically, when the triggering event is sensed, the seat sensors, e.g., the fore-aft position sensor 68, the vertical position sensor 70, and/or the reclining sensor 72, may measure the position of the seat 48. The measurement of the seat position may be received, for example, by the driver monitoring control module 62, the restraints control module 16, the body control module 18, and/or the height adjustment module.

As shown in block 120, the method includes receiving a measurement of the payout of the seat belt 40. As set forth above, the payout sensor 68 may measure the payout of the seat belt 40. When the triggering event is sensed, the driver monitoring control module 62, the restraints control module 16, the body control module 18, and/or the height adjustment module may receive the measurement of the payout from the payout sensor 68.

With continued reference to FIG. 4, as shown in block 122, the method includes calculating a desired position of a seat belt height adjuster 14. Specifically, the method includes calculating the desired position based on eye location L, seat position, and/or payout of the seat belt 40.

At least one of the driver monitoring control module 62, the restraints control module 16, the body control module 18, and/or the height adjustment module may calculate the desired location of the seat belt height adjuster 14. For example, driver monitoring control module 62, the restraints control module 16, the body control module 18, and/or the height adjustment module may use the anthropometric data along with the eye location L, seat position and/or seat belt payout, as referenced above, to calculate the desired position of the seat belt height adjuster 14. Specifically, the driver monitoring control module 62, the restraints control module 16, the body control module 18, and/or the height adjustment module may determine a regression model of anthropometric data and at least the eye location L, seat position, and/or payout, and calculating the desired position based on at least the regression model.

When the desired position of the seat belt height adjuster 14 is determined, the method includes instructing the seat belt height adjuster 14 to move to the desired position, as shown in block 124. For example, the restraints control module 16 may instruct the motor 32 of the seat belt height adjuster 14 to move seat belt ring 24 to the desired position. As shown in block 126, the driver 80 may manually adjust the seat belt height adjuster 14 after the seat belt height adjuster 14 is adjusted to the desired position.

As shown in block 128, the method includes storing the desired position of the seat belt height adjuster 14 in memory. For example, the memory may be a component of a security system of the vehicle that remembers settings for specific users, e.g., the Ford Motor Company MyKey® system. For example, the security system may include a key that allows access to the vehicle 12 and turns on the vehicle 12, and the key may communicate with the communication bus 64 to identify the driver 80 using the key. As such, various drivers 80 may each use a different key and, when the key communicates with the communication bus 64, features of the vehicle 12, such as the desired position of the seat belt height adjuster 14, may be automatically adjusted. The security system may record a history of previous positions of the seat belt height adjuster 14 for a specific key and may calculate a median position at which the seat belt height adjuster 14 is adjusted when the key is used to access the vehicle 12.

As shown in block 130, the method may include instructing the steering column 74 position adjuster, e.g., the tilt adjuster 76 and/or the telescopic adjuster 78, to adjust a position of a steering column 74 based at least on the measurement of the eye location L, the seat position, and/or payout of the seat belt 40. As shown in block 132, the driver 80 may manually adjust the steering column 74 after the steering column 74 is adjusted to the desired position.

As shown in block 134, the method may include instructing an airbag control module 88 to operate based at least on the measurement of the eye location L, the seat position, and/or the payout of the seat belt 40.

As shown in block 136, the method may include instructing an audio system 90 to operate based at least on the measurement of the eye location L, the seat position, and/or the payout of the seat belt. As shown in block 138, the driver 80 may manually adjust the audio system 90 after the audio system 90 is automatically adjusted.

As shown in block 140, the method may include instructing an instrument display panel 58 to operate based at least on the measurement of the eye location L, the seat position, and/or the payout of the seat belt 40. As shown in block 142, the driver 80 may manually adjust the instrument display panel 58 after the instrument display panel 58 is automatically adjusted.

With reference to FIGS. 5-6, in the second embodiment of the system 10, an eye sensor 60 is configured to determine eye location L of the driver 80 of the vehicle 12. As set forth further below, the system 10 adjusts the position of the seat belt height adjuster 14 based on the eye location L.

With reference to FIGS. 5-6, the second embodiment of the system 10 adjusts the position of the seat belt height adjuster 14 based on a size, e.g., girth and/or height, and weight of the driver 80. Specifically, the second embodiment of the system 10 includes the seat belt retractor 42 including the payout sensor 68 configured to measure payout of a seat belt relative to the seat belt retractor 42. The seat 48 includes the seat sensors, e.g., the fore-aft position sensor 68 and/or the vertical position sensor 70, configured to measure the seat position. The restraints control module 16 and/or the body control module 18 may be programmed to calculate a size of the driver 80 based at least on the payout and the seat position.

With reference to FIG. 5, the seat 48 may include a weight sensor 92 configured to measure a weight of a driver 80 of the seat 48. The restraints control module 16 and/or the body control module 18 may be programmed to adjust a position of the seat belt height adjuster 14 based at least on the size and weight of the driver 80.

Specifically, the restraints control module 16 and/or the body control module 18 may be programmed with anthropometric data and may be programmed to compare at least the size and weight of the driver 80 with the anthropometric data to calculate the desired position of the seat belt height adjuster 14. Specifically, the restraints control module 16 and/or the body control module 18 may be programmed to determine a regression model of the anthropometric data and the size, e.g., the girth and/or height, and weight of the driver 80 and to calculate the desired position of the seat belt height adjuster 14 based on the regression model.

The weight sensor 92 may be connected to the restraints control module 16. The weight sensor 92 may measure the weight of the driver 80 and communicate the weight measurement to the restraints control module 16. The restraints control module 16 may communicate the weight measurement to the communication bus 64.

In addition to the payout and the seat position, the size of the driver 80 may also be calculated based on at least the column position of the steering column 74, e.g., the measurement of the tilt position from the tilt sensor 84 and/or the measurement of the telescopic position from the telescopic position sensor 86. Specifically, the restraints control module 16 and/or the body control module 18 may be programmed to calculate the size of the driver 80 based on at least the column position.

With continued reference to FIG. 5, the restraints control module 16 and/or the body control module 18 may be programmed to adjust operation of the airbag control module 88, the audio system 90, and/or the instrument display panel 58 based at least on the size and weight.

With reference to FIG. 6, an exemplary method of operating the second embodiment of the system 10 is generally shown. The method includes receiving a seat belt payout measurement (as shown in block 244), receiving a seat position measurement, e.g., the vertical position of the seat as shown in block 246 and/or the fore-aft position of the seat as shown in block 248, receiving a weight measurement of the driver 80 as shown in block 250, and receiving a position measurement of the steering column 74 as shown in block 252.

As shown in block 254, the method includes calculating the size of the driver 80, e.g., the girth and height, based on at least the payout of the seat belt, the seat position, e.g., the vertical position and/or the fore-aft position, and/or the column position. Specifically, as set forth above, the restraints control module 16 and/or the body control module 18 may be programmed with anthropometric data. The restraints control module 16 and/or the body control module 18 may be programmed to compare at least the payout, the seat position, and/or the column position with the anthropometric data to calculate the size of the driver 80. For example, the restraints control module 16 and/or the body control module 18 may be programmed to determine a regression model of the anthropometric data and the payout, seat position, and/or column position to calculate the size of the driver 80.

As shown in block 256, the restraints control module 16 and/or the body control module 18 may be programmed to compare at least the size and weight of the driver 80 with the anthropometric data to calculate the desired position of the seat belt height adjuster 14. The restraints control module 16 and/or the body control module 18 may be programmed to determine a regression model of the anthropometric data and the size and weight to calculate the desired position of the seat belt height adjuster 14 based on the regression model. Based on this calculation, the restraints control module 16 and/or body control module 18 may instruct the seat belt height adjuster 14 to move to the desired position, as shown in block 258.

With continued reference to FIG. 6, the method includes instructing the airbag control module 88 to operate based on the size and weight of the driver 80, instructing the audio system 90 to operate based on the size and weight of the driver 80 and/or instructing an instrument display panel 58 to operate based on the size and weight of the driver 80.

The first and second embodiment of the system 10 may include a camera system, e.g., an infrared camera system, configured to determine the location of the head of the driver 80. This location of the head may be communicated to the communication bus 64 and at least one of the modules, e.g., the restraints control module 16, body control module 18, driver monitoring control module 62, and/or height adjustment module, may adjust the seat belt height adjuster 14 based at least on the measurement of the location of the head. The location of the head may be used to calculate the desired position of the seat belt height adjuster 14 in addition to the measurements discussed above, e.g., the eye location, seat position, steering column position, size of the driver, weight of the driver, etc. In addition to, or in the alternative to, determining the location of the head, the camera system may be configured to determine the location of any body part of the driver 80.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A system for a vehicle, the system comprising:
a seat belt height adjuster;
a sensor configured to determine eye location of a driver of the vehicle;
a payout sensor that senses payout of a seatbelt relative to a retractor;
a control module in communication with the sensor, the payout sensor, and the seat belt height adjuster;
the control module being programmed to adjust a position of the seat belt height adjuster based at least on the eye location and payout of the seatbelt;
the control module sensing a triggering event of the vehicle and determining the eye position as a result of sensing the triggering event of the vehicle; and
an airbag module in communication with the sensor, the airbag module being programmed to adjust operation of the airbag module based at least on eye position and payout of the seatbelt.

2. The system as set forth in claim 1 further comprising a key and a memory storing a desired position of the seat belt height adjuster associated with the key.

3. The system as set forth in claim 1 wherein the control module is programmed with anthropometric data and is programed to compare at least the eye location with the anthropometric data to calculate the position of the seat belt height adjuster.

4. The system as set forth in claim 3 wherein the control module is programmed to determine a regression model of the anthropometric data and the eye location to calculate the position of the seat belt height adjuster based on the regression model.

5. The system as set forth in claim 1 wherein the seat belt height adjuster includes seat belt ring, a motor in communication with the control module, and a linear actuator disposed between the ring and the motor.

6. The system as set forth in claim 5 further comprising a seat belt supported on the seat belt ring.

7. The system as set forth in claim 1 further comprising a steering column, a steering column position adjuster, and a steering control module in communication with the sensor and the steering column position adjuster, the steering control module being programmed to adjust a position of the steering column based at least on the eye location.

8. The system as set forth in claim 1 further comprising an audio system in communication with the sensor, the audio system being programmed to adjust operation of the audio system based at least on the eye location.

9. The system as set forth in claim 1 further comprising an instrument panel display in communication with the sensor, the instrument panel display being programmed to adjust operation of the instrument panel display based at least on the eye location.

10. The system as set forth in claim 1, wherein the triggering event of the vehicle is ignition of the vehicle.

11. The system as set forth in claim 1 further comprising a fore-aft position sensor, a vertical position sensor, and a reclining sensor each in communication with the control module, the fore-aft position sensor configured to measure a fore-aft position of a seat bottom, the vertical position sensor configured to measure a vertical position of the seat bottom, and the reclining sensor configured to measure a reclining angle between a seat back and the seat bottom the control module being programmed to adjust the position of the seat belt height adjuster based at least on the fore-aft position, the vertical position, and the reclining angle.

12. The system as set forth in claim 11, further comprising at least one seat sensor configured to determine a position of a seat, wherein the airbag module is programmed to adjust operation of the airbag module based at least on the position of the seat.

13. A method comprising:
receiving a measurement of an eye location of a driver of a vehicle;
receiving a measurement of payout of a seatbelt relative to a retractor;
calculating a desired position of a seat belt height adjuster based on at least the measurement of the eye location and the measurement of the payout of the seatbelt;
instructing the seat belt height adjuster to move to the desired position;
sensing a triggering event of the vehicle and determining the eye position as a result of sensing the triggering event of the vehicle; and
adjusting operation of the airbag module based at least on the eye position and payout of the seatbelt.

14. The method as set forth in claim 13 further comprising receiving a measurement of a seat position and calculating the desired position based on at least the measurement of the seat position.

15. The method as set forth in claim 13 further comprising determining a regression model of anthropometric data and at least the eye location and calculating the desired position based on at least the regression model.

16. The method as set forth in claim 13 further comprising storing in memory the desired position associated with a key, and subsequently accessing the vehicle with the key and automatically moving the seatbelt height adjuster to the desired position as a result of the subsequent access.

17. The method as set forth in claim 13 further comprising instructing a steering column position adjuster to adjust a position of a steering column based at least on the measurement of the eye location.

18. The method as set forth in claim 13 further comprising instructing an audio system to operate based at least on the measurement of the eye location.

19. The method as set forth in claim 13 further comprising instructing an instrument panel display to operate based at least on the measurement of the eye location.

* * * * *